US008550895B2

(12) United States Patent
Edidin et al.

(10) Patent No.: US 8,550,895 B2
(45) Date of Patent: Oct. 8, 2013

(54) WAGERING A POTENTIAL FUTURE AWARD FOR A GREATER AWARD OPPORTUNITY

(75) Inventors: Orrin Edidin, Northbrook, IL (US); Allon G. Englman, Chicago, IL (US); Jeremy M. Hornik, Chicago, IL (US); Daniel Louie, Chicago, IL (US); Michael W. Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 912 days.

(21) Appl. No.: 12/670,131

(22) PCT Filed: Jul. 25, 2008

(86) PCT No.: PCT/US2008/009013

§ 371 (c)(1), (2), (4) Date: Jan. 22, 2010

(87) PCT Pub. No.: WO2009/014738

PCT Pub. Date: Jan. 29, 2009

(65) Prior Publication Data

US 2010/0210344 A1 Aug. 19, 2010

Related U.S. Application Data

(60) Provisional application No. 60/952,174, filed on Jul. 26, 2007.

(51) Int. Cl.
*G06F 19/00* (2011.01)

(52) U.S. Cl.
USPC .............................................. 463/20; 463/16

(58) Field of Classification Search
USPC ...................................................... 463/16, 20
See application file for complete search history.

(56) References Cited

U.S. PATENT DOCUMENTS 6,068,552 A * 5/2000 Walker et al. .................. 463/21
6,190,254 B1 2/2001 Bennett
6,267,669 B1 7/2001 Luciano, Jr. et al.
6,331,143 B1 * 12/2001 Yoseloff .......................... 463/18

(Continued)

FOREIGN PATENT DOCUMENTS

GB 2056737 A 3/1981
GB 2072914 A 10/1981

(Continued)

OTHER PUBLICATIONS

International Search Report dated Oct. 23, 2008 for PCT/2008/009013 (2 pages).

*Primary Examiner* — Dmitry Suhol
*Assistant Examiner* — Jason Yen
(74) *Attorney, Agent, or Firm* — Nixon Peabody LLP

(57) ABSTRACT

A wagering game has an overall payback percentage and a portion of the wagering game has a default expected value. A gamble feature is offered to the player prior to play of the portion of the wagering game but after a wager has been received. The gamble feature has a possibility of a successful outcome or an unsuccessful outcome. The outcome of the gamble feature affects the default expected value for the portion of the wagering game. The default expected value of the portion of the wagering game is altered based on the outcome of the gamble feature. The portion of the wagering game is conducted using the altered expected value.

27 Claims, 9 Drawing Sheets

(56) References Cited

U.S. PATENT DOCUMENTS

| | | | | |
|---|---|---|---|---|
| 6,375,187 | B1 | 4/2002 | Baerlocher | |
| 6,506,118 | B1 | 1/2003 | Baerlocher et al. | |
| 6,599,192 | B1 | 7/2003 | Baerlocher et al. | |
| 6,632,141 | B2 | 10/2003 | Webb et al. | |
| 6,648,754 | B2 | 11/2003 | Baerlocher et al. | |
| 6,719,632 | B2 | 4/2004 | Palmer et al. | |
| 6,758,750 | B2 | 7/2004 | Baerlocher et al. | |
| 6,793,579 | B2 | 9/2004 | Baerlocher et al. | |
| 6,796,905 | B2 | 9/2004 | Baerlocher et al. | |
| 6,808,452 | B2 | 10/2004 | Baerlocher et al. | |
| 6,852,030 | B2 | 2/2005 | Baerlocher et al. | |
| 6,890,257 | B2 | 5/2005 | Baerlocher | |
| 6,899,623 | B2 | 5/2005 | Baerlocher | |
| 6,942,566 | B2 | 9/2005 | Baerlocher et al. | |
| 6,942,567 | B2 | 9/2005 | Baerlocher et al. | |
| 6,960,132 | B2 | 11/2005 | Baerlocher et al. | |
| 7,001,273 | B2 | 2/2006 | Baerlocher | |
| 7,235,010 | B2 | 6/2007 | Baerlocher | |
| 7,270,604 | B2 | 9/2007 | Gerrard et al. | |
| 7,331,864 | B2 | 2/2008 | Baerlocher | |
| 7,364,507 | B2 | 4/2008 | Baerlocher et al. | |
| 7,407,435 | B2 | 8/2008 | Baerlocher et al. | |
| 7,470,184 | B2 | 12/2008 | Baerlocher et al. | |
| 7,566,272 | B2 | 7/2009 | Gerrard et al. | |
| 7,572,184 | B2 | 8/2009 | Baerlocher et al. | |
| 7,601,057 | B2 | 10/2009 | Kaminkow | |
| 7,625,282 | B2 | 12/2009 | Baerlocher et al. | |
| 7,637,808 | B2 | 12/2009 | Roukis | |
| 2003/0054871 | A1* | 3/2003 | Baerlocher | 463/16 |
| 2003/0060256 | A1 | 3/2003 | Joshi | |
| 2003/0166410 | A1* | 9/2003 | Olive | 463/13 |
| 2003/0207707 | A1 | 11/2003 | Slomiany et al. | |
| 2004/0033826 | A1* | 2/2004 | Berman | 463/16 |
| 2004/0242302 | A1* | 12/2004 | Baerlocher | 463/16 |
| 2004/0254009 | A1* | 12/2004 | D'Amico et al. | 463/25 |
| 2005/0026672 | A1* | 2/2005 | Roukis | 463/16 |
| 2005/0026677 | A1* | 2/2005 | Roukis | 463/20 |
| 2005/0079908 | A1 | 4/2005 | Pacey | |
| 2005/0096115 | A1* | 5/2005 | Vancura | 463/16 |
| 2005/0148383 | A1* | 7/2005 | Mayeroff | 463/20 |
| 2005/0215311 | A1* | 9/2005 | Hornik et al. | 463/20 |
| 2006/0040735 | A1 | 2/2006 | Baerlocher | |
| 2006/0084494 | A1* | 4/2006 | Belger et al. | 463/20 |
| 2006/0084496 | A1* | 4/2006 | Jaffe et al. | 463/20 |
| 2006/0267281 | A1 | 11/2006 | Johnston | |
| 2007/0060271 | A1* | 3/2007 | Cregan et al. | 463/16 |
| 2007/0060332 | A1 | 3/2007 | Anderson et al. | |
| 2008/0045303 | A1* | 2/2008 | Dunaevsky et al. | 463/20 |
| 2009/0117989 | A1* | 5/2009 | Arezina et al. | 463/20 |

FOREIGN PATENT DOCUMENTS

| | | | |
|---|---|---|---|
| GB | 2092797 | A | 8/1982 |
| GB | 2096376 | A | 10/1982 |
| GB | 2144568 | A | 3/1985 |
| GB | 2144644 | A | 3/1985 |
| GB | 2152262 | A | 7/1985 |
| GB | 2165385 | A | 4/1986 |
| GB | 2181589 | A | 4/1987 |
| GB | 2182476 | A | 5/1987 |
| GB | 2183882 | A | 6/1987 |
| GB | 2191030 | A | 12/1987 |
| GB | 2210191 | A | 6/1989 |
| GB | 2222712 | A | 3/1990 |
| GB | 2226907 | A | 7/1990 |
| GB | 2230373 | A | 10/1990 |
| GB | 2242300 | A | 9/1991 |
| WO | 2006/068844 | | 6/2006 |

* cited by examiner

WAGERING A POTENTIAL FUTURE AWARD FOR A GREATER AWARD OPPORTUNITY

CROSS-REFERENCE To RELATED APPLICATIONS

This application is a U.S. national stage of International Application No. PCT/US2008/009013, filed Jul. 25, 2008, which is related to and claims the benefit of U.S. Provisional Application No. 60/952,174, filed Jul. 26, 2007, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a system and method for allowing a player to risk a potential future award for an even greater award opportunity and for allowing the players to adjust their volatility through interactive game-play features.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

One concept that has been employed to increase the perceived likelihood of winning money is to allow a player to risk a previously accrued win for an even bigger win. In certain games, a player is allowed to risk a credit award—that the player earned through play of a wagering game—in a "double up" type event after the wagering game has concluded. This double-up event prompts the player to select one of two possible outcomes (e.g., a card is displayed and the player selects whether it is red or black before the card is revealed) and, if the player chooses correctly, doubles the credits that the player earned during the preceding wagering game. Alternatively, if the player chooses incorrectly, the earned credits are retained by the gaming machine and the player is left with nothing. This type of double-up game is only available to the player once a wagering game has completed and does not enhance the gaming experience in any way while the actual wagering game is being played by the player. Only after a winning wagering game can a player access the double-up feature and the double-up feature is limited to increasing a credit award from a preceding wagering game after the preceding game has concluded.

SUMMARY OF THE INVENTION

According to one aspect of the present invention, one or more computer readable storage media encoded with instructions for directing a gaming system to perform a method is disclosed. A wager is received from a player to play a wagering game. The wagering game has an overall payback percentage and a portion of the wagering game has a default expected value. A gamble feature is offered to the player prior to play of the portion of the wagering game but after the wager has been received. The gamble feature has a possibility of a successful outcome or an unsuccessful outcome. The outcome of the gamble feature affects the default expected value for the portion of the wagering game. The default expected value of the portion of the wagering game is altered based on the outcome of the gamble feature. The portion of the wagering game is conducted using the altered expected value.

According to another aspect of the invention, a gaming system is disclosed. The gaming system comprises a value-input device, a display, and a controller. The value-input device receives a wager from a player to play a wagering game. The wagering game has an overall payback percentage and a portion of the wagering game has a default expected value. The display displays the wagering game. The controller is operative to display a gamble feature to the player on the display. The gamble feature is displayed prior to play of the portion of the wagering game but after the wager has been received. The gamble feature has a possibility of a successful outcome or an unsuccessful outcome and the outcome of the gamble feature affects the default expected value for the portion of the wagering game. The controller is further operative to determine the outcome of the gamble feature. The controller is further operative to alter the default expected value for the portion of the wagering game based on the determined outcome of the gamble feature. The controller is further operative to conduct the wagering game on the primary display using the altered expected value.

According to another aspect of the invention, a method of conducting a wagering game on a gaming system is disclosed. The method comprises receiving a wager from a player to play a wagering game. A portion of the wagering game has a default expected value. A gamble feature is offered prior to play of the portion of the wagering game but after receiving the wager. A determination is made whether the gamble feature has been accepted or declined. In response to the gamble feature being declined, the portion of the wagering game is conducted utilizing the default expected value. In response to the gamble feature being accepted, a determination is made whether the outcome of the gamble feature is successful or unsuccessful. In response to the gamble feature being successful, the portion of the wagering game is conducted with an increased expected value. The increased expected value is greater than the default expected value. In response to the gamble feature being unsuccessful, the portion wagering game is conducted having a decreased expected value. The decreased expected value is lower than the default expected value.

According to yet another aspect of the invention, one or more computer readable storage media is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

Figure 1A:
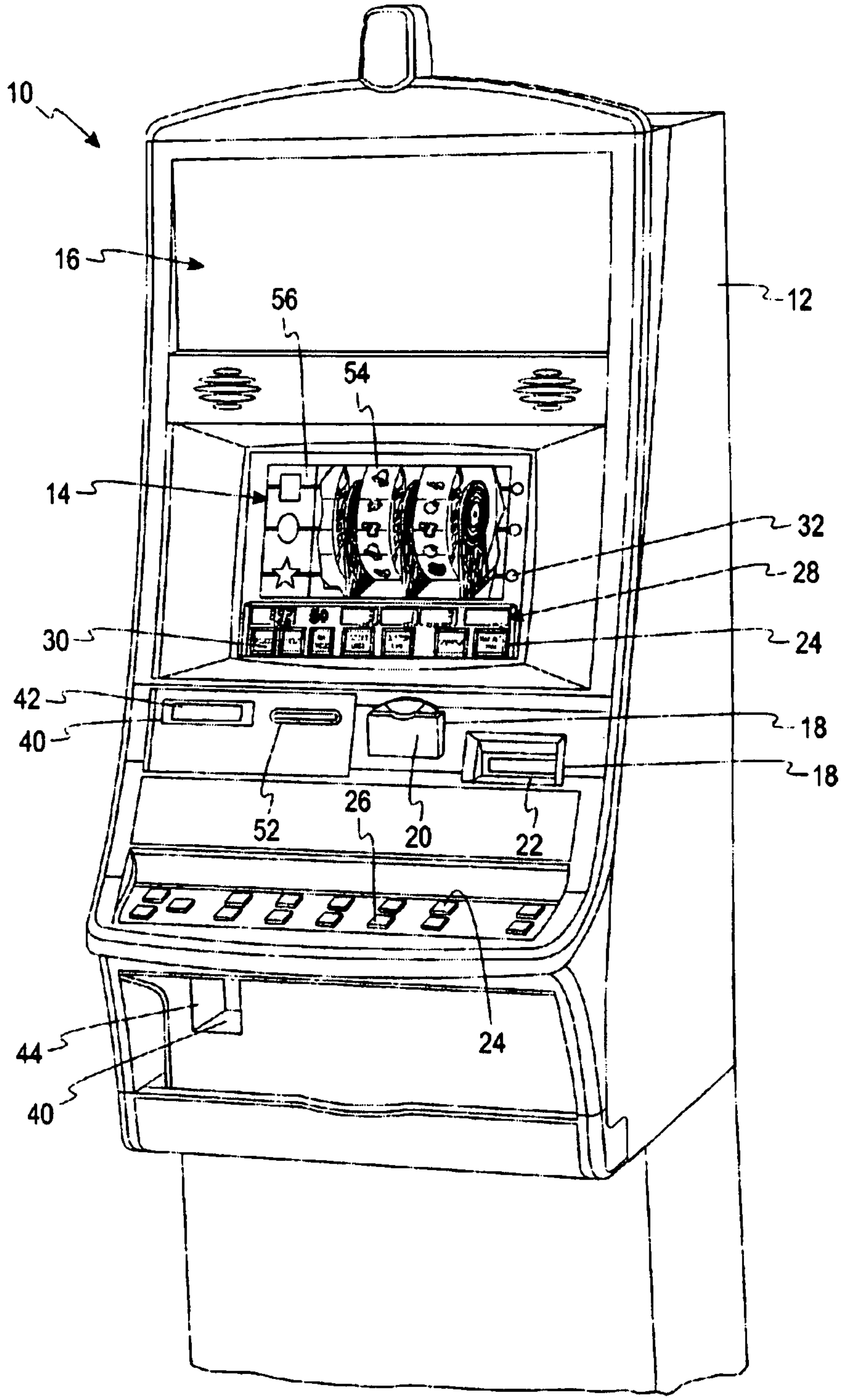
FIG. 1*a* is a perspective view of a free standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 similar to those used in gaming establishments, such as casinos, is shown. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, craps, etc.

The illustrated gaming machine 10 comprises a housing 12 and a number of input devices, including a value-input device 18 and a player-input device 24. For outputs, the gaming machine 10 comprises a primary display area 14 for displaying information about base wagering games and may include a secondary display area 16 for displaying game events, game outcomes, and/or signage information. The primary display area 14 and/or secondary display area 16 may also display information about bonus wagering games and progressive wagering games. While these typical components found in the gaming machine 10 are described below, it should be understood that numerous other elements may exist and may be used in any number of combinations to create various forms of a gaming machine.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The primary display area 14 may be a mechanical-reel display, a video display (such as the one illustrated in FIG. 1*b*), or a transmissive display overlaying a mechanical-reel display or a video display. Where the primary display area 14 includes a video display, the video display may be a cathode ray tube (CRT), a high resolution liquid crystal display (LCD), a plasma display, a light emitting diode (LED), an electroluminescent (EL) panel, or any other type of display suitable for use in the gaming machine 10. The primary display area 14 may include one or more paylines 32 extending along a portion thereof. In the illustrated embodiment, the primary display area 14 comprises a plurality of mechanical reels 54 and a transmissive display 56 superimposed over the mechanical reels 54. Each of the foregoing components is described in more detail below.

The value-input device 18 may be provided in many forms, individually or in combination, and is preferably located on the front of the housing 12. The value-input device 18 receives currency and/or credits that are inserted by a player. The value-input device 18 may include a coin acceptor 20 for receiving coin currency. Alternatively, or in addition, the value-input device 18 may include a bill acceptor 22 for receiving paper currency. Furthermore, the value-input device 18 may include a ticket reader or barcode scanner for reading information stored on a credit ticket, a card, or other tangible portable credit storage device. The credit ticket or card may also authorize access to a central account, which can transfer money to the gaming machine 10.

The player-input device 24 comprises a plurality of push buttons 26 on a button panel for operating the gaming machine 10. In addition, or alternatively, the player-input device 24 may comprise a touch screen 28 mounted by adhesive, tape, or the like on the primary display area 14 (over the transmissive display 56) and/or on the secondary display area 16. The touch screen 28 contains soft touch keys 30 denoted by graphics on the underlying primary display area 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

A player begins play of the base wagering game by making a wager via the value-input device 18 of the gaming machine 10. A player can select play by using the player-input device 24, via the buttons 26 or the soft touch keys 30. The base game consists of a plurality of symbols arranged in an array and includes at least one payline 32 that indicates one or more outcomes of the base game. Such outcomes are randomly selected in response to the wagering input by the player. One or more of the plurality of randomly selected outcomes may be a start-bonus outcome, which can include any variations of symbols or symbol combinations triggering a bonus game. Alternatively or additionally, a bonus game may be initiated in response to a mystery trigger occurring during play of the base game.

In some embodiments, the gaming machine 10 may also include a player-information reader 52 that allows for identification of a player by reading a card with information indicating his or her true identity. The player information reader 52 is shown in FIG. 1*a* as a card reader, but may take on many forms including a ticket reader, bar code scanner, RFID transceiver, or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player-information reader 52, which allows the casino's computers to register that player's wagering at the gaming machine 10. The gaming machine 10 may use the secondary display area 16 or other dedicated player-tracking display for providing the player with information about his or her account or other player-specific information. Also, in some embodiments, the player-information reader 52 may be used to restore game assets that the player achieved and saved during a previous game session.

In the illustrated embodiment, the gaming machine 10 is an "upright" version in which the primary display area 14 is oriented vertically relative to the player. Alternatively, the gaming machine may be a "slant-top" version in which the primary display area 14 is slanted at about a thirty-degree angle toward the player of the gaming machine 10. Furthermore, although only three mechanical reels are shown in the primary display area 14, those having ordinary skill in the art will recognize that the gaming machine 10 may comprise fewer or more mechanical and/or video reels (e.g., four reels, five reels, etc.), depending on the particular configuration of the primary display area 14.

Figure 2A:
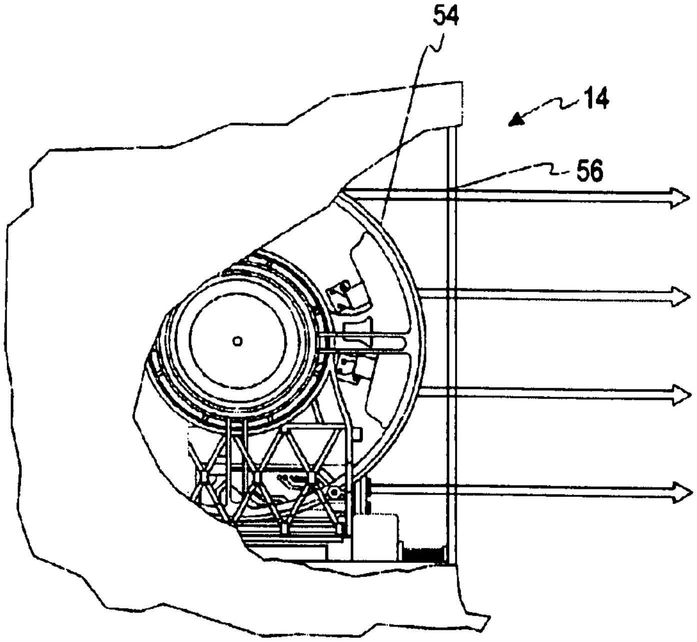
FIG. 2*a* is a cross-sectional side view of a display area according to an embodiment of the present invention.
Figure 2B:
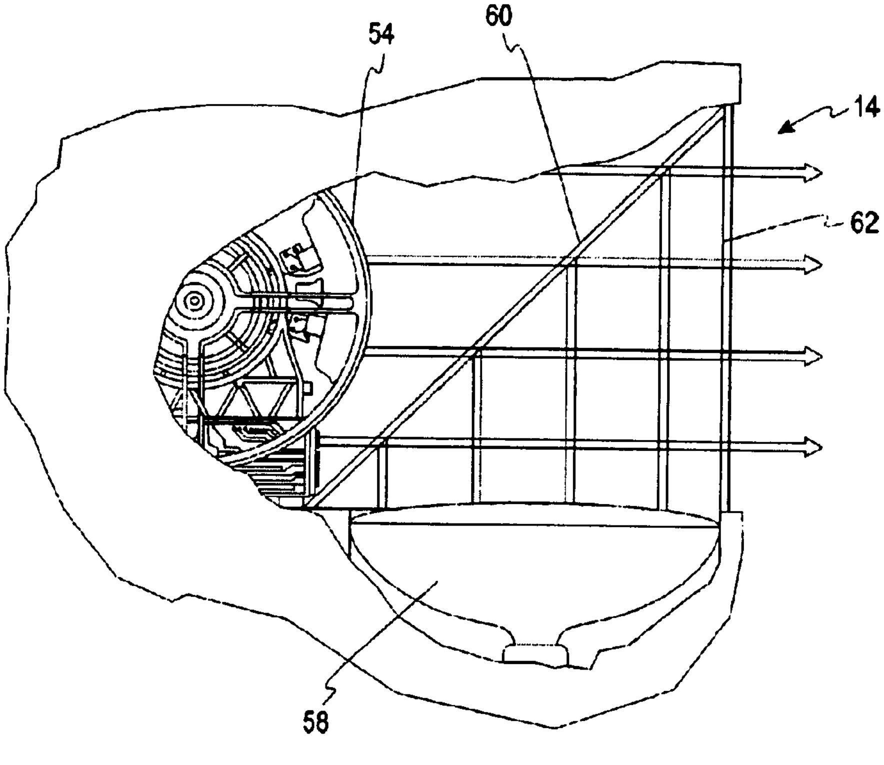
FIG. 2*b* is a cross-sectional side view of a display area according to an embodiment of the present invention.

FIGS. 2*a*-2*b* illustrate exemplary implementations of the primary display area 14 in which a video image is superimposed over the mechanical reels 54. Although not expressly labeled, each reel of the mechanical reels 54 has a plurality of reel symbols (see FIG. 1*a*) that represent a randomly-selected outcome of the wagering game. The video image may then be positioned over the mechanical reels 54 to enhance and/or alter the appearance (e.g., color, texture, etc.) of the mechanical reels 54. There are at least two possible configurations for the primary display area 14: a direct image configuration (FIG. 2*a*); and a virtual image configuration (FIG. 2*b*). These configurations are described below.

Referring to FIG. 2*a*, in the direct image configuration, a transmissive display 56 is positioned directly in front of the mechanical reels 54 and generates a direct image. In such an arrangement, the transmissive display 56 may be a flat-panel transmissive video display, for example, a transmissive liquid crystal display (LCD) commercially available from LG Phillips LCD Co., Ltd., of Seoul, Korea, Sharp Electronics Corp. of Tokyo, Japan, and other display manufacturers. In other embodiments, the flat-panel transmissive video display may be an organic light emitting diode (OLED) display, an electroluminescent (EL) panel, an organic electroluminescent (OEL) panel, a vacuum florescent display (VFD), etc. The transmissive display 56 is preferably preconfigured with the touch screen 28 (see FIG. 1*a*) mounted to a front surface of the display.

In the virtual image configuration, shown in FIG. 2*b*, a reflected video image is used instead of a direct image. In such an arrangement, the reflected video image may be generated by, for example, a standard video display 58 and a partially-reflective mirror 60. The standard video display 58 may be mounted below the mechanical reels 54 and substantially normal thereto, and the partially-reflective mirror 60 may be positioned over the mechanical reels 54 at a predetermined angle (e.g., 45 degrees). Video images from the standard video display 58 are then reflected off the partially-reflective mirror 60 so that they appear to a player to be superimposed over the mechanical reels 54. The video projection display 58 may be any suitable video projection display known to those having ordinary skill in the art, including a CRT, LCD, dot matrix, LED, electro luminescent, and the like. In some embodiments, the primary display area 14 further comprises a transparent cover/window 62 positioned over the partially-reflective mirror 60 to protect the mirror 60. Such a cover/window 62 may be optionally configured with the touch screen 28 for receiving player input.

The superimposed video images may be selectively made transparent, semi transparent (i.e., translucent), or opaque in selected places. This allows preselected images to be displayed over certain portions of the primary display area 14, with the result that certain areas of the primary display area 14 are either altered in some way (e.g., highlighted, colored, etc.), or completely blocked by the superimposed images. All video images superimposed on the primary display area 14 may be rendered in two-dimensional (e.g., using Flash Macromedia™) or three-dimensional graphics (e.g., using Renderware™). The images may be played back (e.g., from a recording stored on the gaming machine 10), streamed (e.g., from the gaming network), or received as a TV signal (e.g., either broadcast or via cable). The images may be animated, or they may be real-life images, either prerecorded (e.g., in the case of marketing/promotional material) or as live footage, and the format of the video images may be an analog format, a standard digital format, or a high-definition (HD) digital format. Using superimposed video images in this way allows numerous types of improvements and enhancements to be made to the appearance of the primary display area 14 in real time and during ongoing game play.

Figure 3:
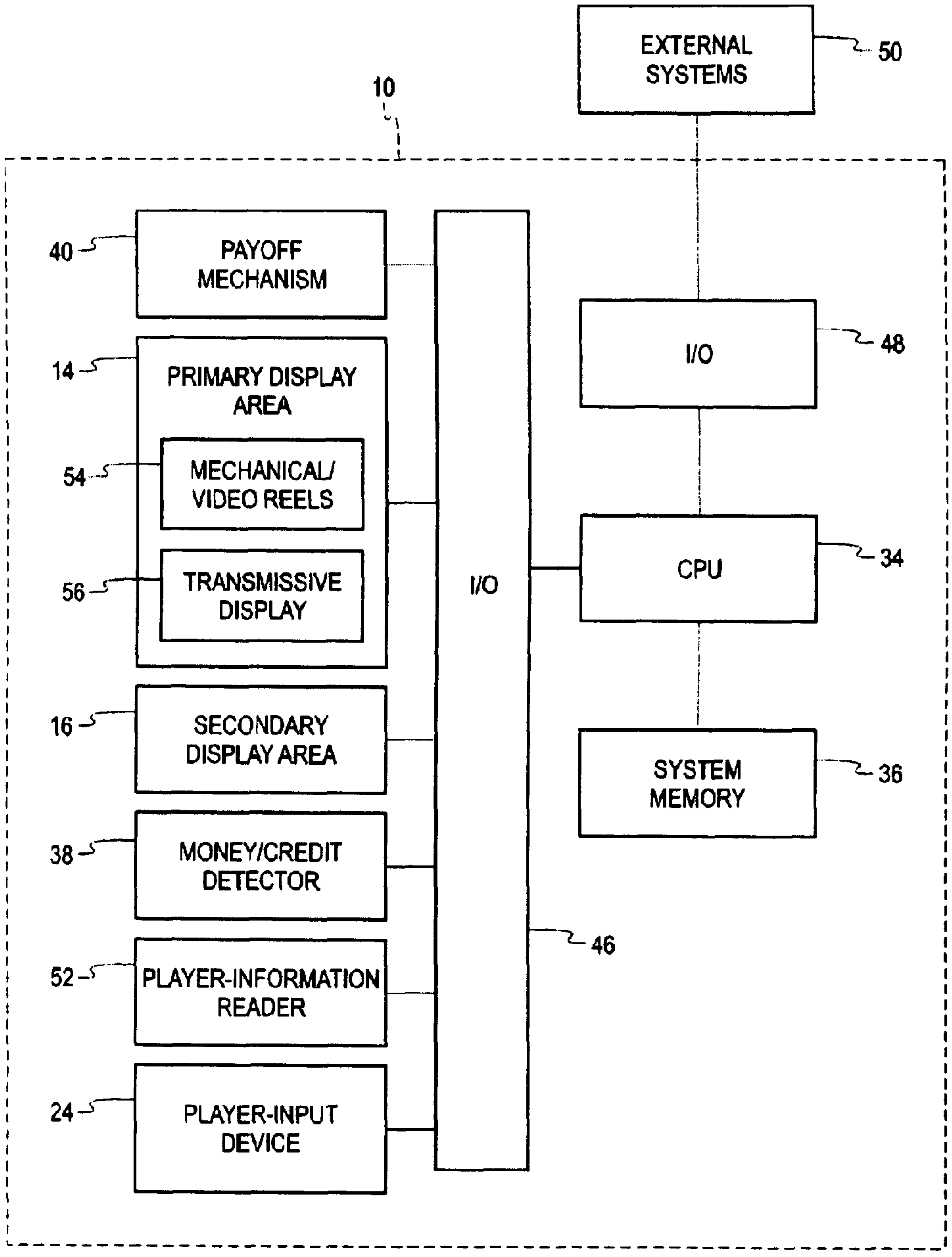
FIG. 3 is a block diagram of a control system suitable for operating the gaming machines of FIGS. 1*a* and 1*b;*

By virtue of the superimposed video images, a variety of traditional as well as visually-enhanced wagering games involving the mechanical reels 54 may be played on the gaming machine 10. These wagering games may be provided to the gaming machine 10 using any suitable means known to those having ordinary skill in the art, including hardware upgrades as well as direct downloads via external systems 50 (FIG. 3).

Thus far, embodiments of the invention have only been described as video images being superimposed on the primary display area 14. It is also possible, however, to superimpose the video images on the secondary display area 16 as well without departing from the scope of the invention. Still, in most embodiments, the primary display area 14 is the one with the video images superimposed thereon. The reason for this is because in most gaming machines 10, the primary display area 14 is the one that includes the mechanical reels (e.g., for a slot machine), a mechanical wheel (e.g., a roulette game), one or more dice, a pachinko board, or other board game. In alternative embodiments, however, the primary display area 14 may include video reels and the video images may then be superimposed, via the transmissive display 56, over the video reels as needed. In further alternative embodiments, the primary display area 14 may include a diorama presenting a three dimensional model of a game environment.

The diorama may be stationary in some implementations, or it may slide or move around in one or more dimensions.

Figure 1B:
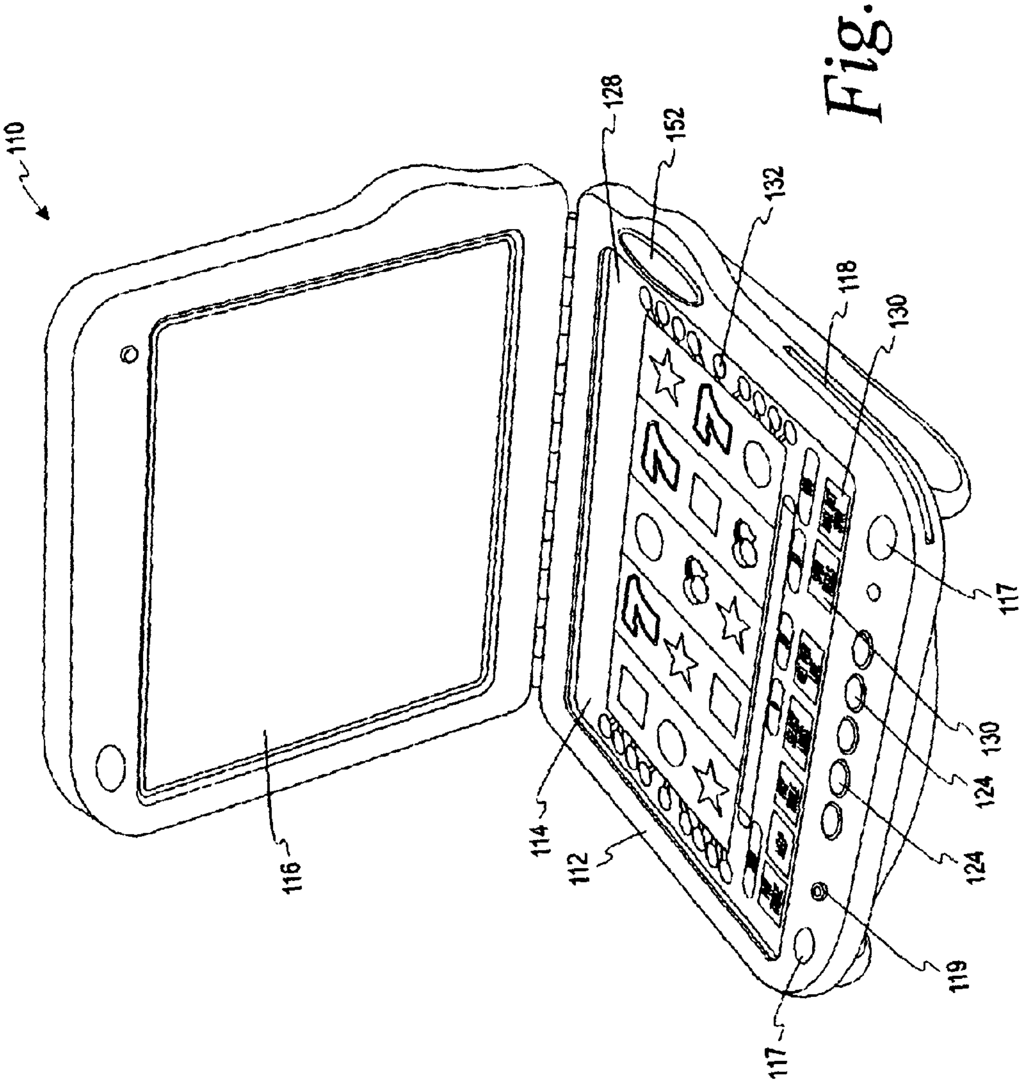
FIG. 1*b* is a perspective view of a handheld gaming machine according to an embodiment of the present invention.

Turning now to FIG. 1*b*, a handheld or mobile gaming machine 110 is illustrated according to one embodiment. The handheld gaming machine 110 is preferably an electronic gaming machine configured to play a video casino game such as, but not limited to, slots, keno, poker, blackjack, roulette, craps, etc. The handheld gaming machine 110 comprises a housing or casing 112 and includes input devices, including a value-input device 118 and a player-input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld-gaming-machine status.

The player-accessible value-input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value-input device 118 may comprise a sensor (e.g., an RF sensor) configured to sense a signal (e.g., an RF signal) output by a transmitter (e.g., an RF transmitter) carried by a player. The player-accessible value-input device 118 may also or alternatively include a ticket reader or barcode scanner for reading information stored on a credit ticket, a card, or other tangible portable credit or funds storage device. The credit ticket or card may also authorize access to a central account, which can transfer money to the handheld gaming machine 110.

Still other player-accessible value-input devices 118 may require the use of soft touch keys 130 on a touch screen 128 overlaying a display (e.g., primary display 114 and/or secondary display 116) or player-input devices 124. Upon entry of player identification information and, preferably, secondary authorization information (e.g., a password, PIN number, stored-value-card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value-input device 118 may itself comprise or utilize a biometric player information reader which permits the player to access available funds on a player's account, either alone or in combination with another of the aforementioned player-accessible value-input devices 118. In an embodiment wherein the player-accessible value-input device 118 comprises a biometric player-information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value-input device 118 comprising a biometric player-information reader 152 may require a confirmatory entry from another biometric player-information reader, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value-input device 118 may be provided remotely from the handheld gaming machine 110.

The player-input device 124 comprises a plurality of push buttons on a button panel for operating the handheld gaming machine 110. In addition, or alternatively, the player-input device 124 may comprise a touch screen 128 mounted to a primary display 114 and/or secondary display 116. In one aspect, the touch screen 128 is matched to a display screen having one or more soft touch keys 130 selectable by a player's touching of the associated area of the screen using a finger or a tool, such as a stylus pointer. A player enables a desired function either by touching the touch screen 128 at an appropriate soft touch key 130 or by pressing an appropriate push button 126 on the button panel. The soft touch keys 130 may be used to implement the same functions as the push buttons 126. Alternatively, the push buttons 126 may provide inputs for one aspect of the operating the game, while the soft touch keys 130 may allow for inputs needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) that may be arranged to suit a player's preferences.

The operation of a base wagering game on the handheld gaming machine 110 is displayed to the player on the primary display 114. The primary display 114 can also display a bonus game associated with the base wagering game. The primary display 114 preferably takes the form of a high resolution LCD, a plasma display, an LED, an EL panel, or any other type of display suitable for use in the handheld gaming machine 110. The size of the primary display 114 may vary from, for example, about a 2-3" display to a 15" or 17" display or larger. In at least some aspects, the primary display 114 is a 7-10" display. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free-standing gaming machine 10, a player begins play of the basic wagering game on the handheld gaming machine 110 by making a wager (e.g., via the value-input device 18 or an assignment of credits stored on the handheld gaming machine 110 via the soft touch keys 130, player-input device 124, and/or buttons 126) on the handheld gaming machine 110. In at least some aspects, the base game may comprise a plurality of symbols arranged in an array, and may include one or more paylines 132 that indicates one or more outcomes of the basic game. Such outcomes are randomly selected in response to the wagering input by the player. At least one of the plurality of randomly selected outcomes may be a start-bonus outcome.

In some embodiments, the player-accessible value-input device 118 of the handheld gaming machine 110 may double as a player-information reader 152 that allows for identification of a player by reading a card with information indicating the player's identity (e.g., reading a player's credit card, player-ID card, smart card, etc.). The player-information reader 152 may alternatively or also comprise a bar code scanner, RFID transceiver, or computer readable storage medium interface. The player information reader 152, shown by way of example in FIG. 1*b*, may comprise a biometric sensing device.

Turning now to FIG. 3, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller, for example, a remote controller included within external system 50. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value-input device 18. Preferably, these components are located within the housing 12 of the gaming machine 10, but may be located outboard of the housing 12 and connected to the remainder of the components of the gaming machine 10 via a variety of different wired or wireless connection methods.

As seen in FIG. 3, the controller 34 is also connected to, and controls, the primary display area 14, the player-input device 24, and a payoff mechanism 40. The primary display area 14 in this embodiment uses the transmissive display 56 to superimpose a video image over the mechanical reels 54, but a reflected image arrangement (see FIG. 2*b*) may also be used in other embodiments. The payoff mechanism 40 is operable in response to instructions from the controller 34 to award a payoff to the player in response to certain winning outcomes that might occur in the base game, the bonus game(s), or via an external game or event. The payoff may be provided in the form of points, bills, tickets, coupons, cards, and the like. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, and the like. The payoff amounts distributed by the payoff mechanism 40 are determined by one or more pay tables stored in the system memory 36.

Communications between the controller 34 and both the peripheral components of the gaming machine 10 and the external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, a remote controller, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 3, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal digital assistant (PDA), a counter top or bar top gaming machine, or other personal electronic device such as a portable television, MP3 player, entertainment device, etc.

Security features are advantageously utilized where the gaming machines 10,110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts comprises a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may comprise, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, Establishing Wireless Robust Security Networks: A Guide to IEEE 802.11, and SP 800-48, Wireless Network Security: 802.11, Bluetooth and Handheld Devices, both of which are incorporated herein by reference in their entirety.

Figure 4:
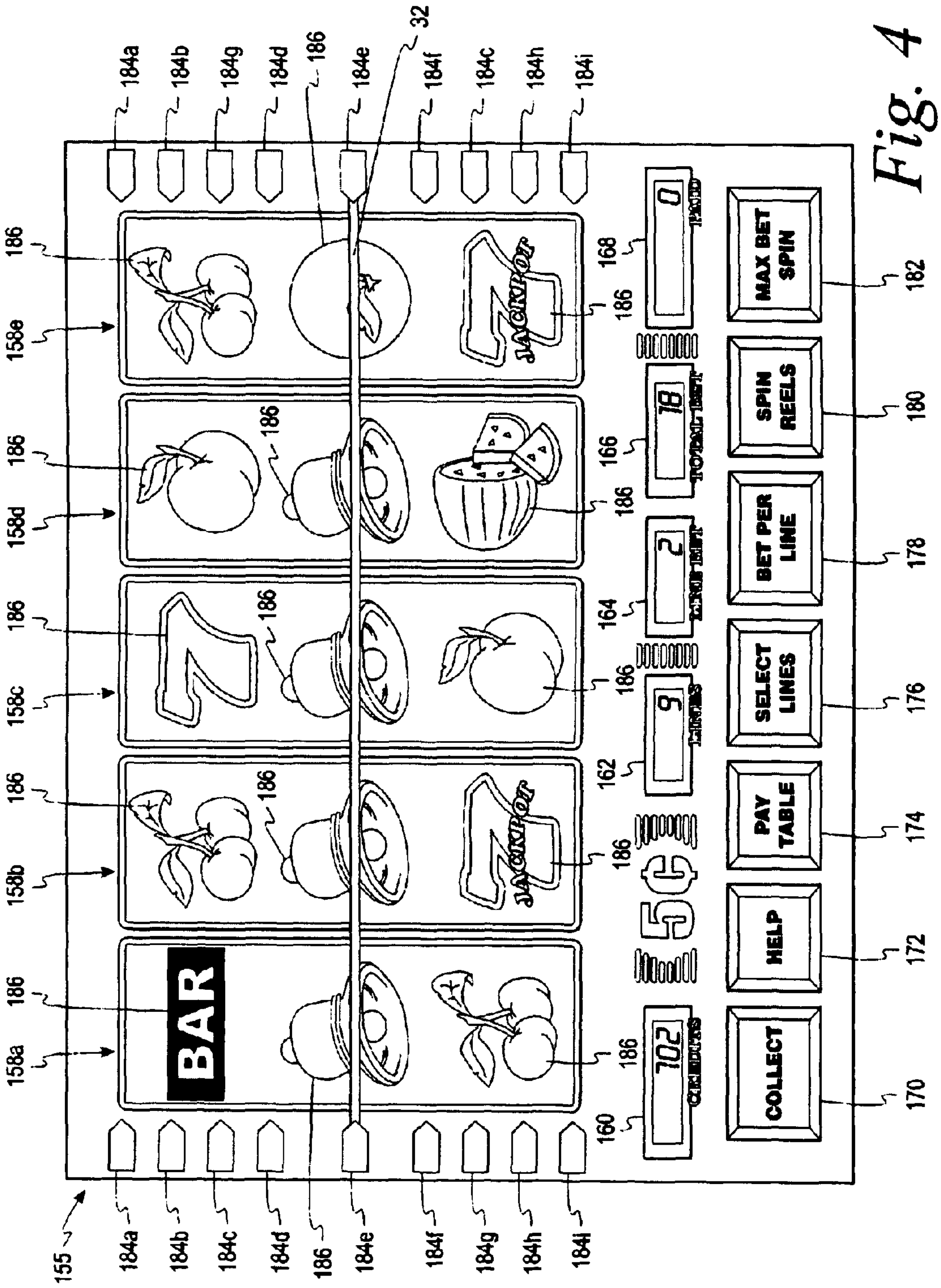
FIG. 4 is an image of a main-game screen of a wagering game that may be displayed on the gaming terminal of FIGS. 1*a* and 1*b*, according to one embodiment of the present invention.

Referring now to FIG. 4, an image of a basic-game screen 155 adapted to be displayed on the primary display area 14, 114 is illustrated, according to one embodiment of the present invention. A player begins play of a basic wagering game by inserting a wager into the value-input device of the gaming machine 10,110. A player can select play by either using the touch screen 28, 128 or push buttons 26. The CPU 34, the external systems 50, or both, in alternative embodiments, operate(s) to execute a wagering game program causing the primary display area 14,114 to display the wagering game that includes a plurality of visual elements.

The basic-game screen 155 may be displayed on the primary display area 14,114 or on a portion thereof. In the illustrated embodiment, the basic-game screen 155 is used to display a plurality of simulated movable reels 158*a-e* with a plurality of symbols 186 displayed thereon. However, the basic-game screen 155 may have a plurality of mechanical reels in other embodiments. The reels 158*a-e* are positioned such that the symbols 186 are displayed relative to one or more paylines 32. As illustrated, the basic-game screen 155 includes a plurality of paylines 32 extending between payline indicators 184*a-i*, yielding a plurality of outcomes for the basic wagering game. The basic-game screen 155 may also display a plurality of game-session meters and various buttons adapted to be actuated by a player.

In the illustrated embodiment, the game session meters include a "credit" meter 160 for displaying a number of credits available for play on the machine; a "lines" meter 162 for displaying a number of paylines to be played by a player on the machine; a "line bet" meter 164 for displaying a number of credits wagered (e.g., from 1 to 5 or more credits) for each of the number of paylines played; a "total bet" meter 166 for displaying a total number of credits wagered for the particular round of wagering; and a "paid" meter 168 for displaying an amount to be awarded based on the results of the particular rounds wager. The user-selectable buttons include a "collect" button 170 to collect the credits remaining in the credits meter 160; a "help" button 172 for viewing instructions on how to play the wagering game; a "pay table" button 174 for viewing a pay table associated with the basic wagering game; a "select lines" button 176 for changing the number of paylines (displayed in the lines meter 162) a player wishes to play; a "bet per line" button 178 for changing the amount of the wager which is displayed in the line-bet meter 164; a "spin reels" button 180 for moving the reels 158*a-e*; and a "max bet spin" button 182 for wagering a maximum number of credits and moving the reels 158*a-e* of the basic wagering game. While the gaming machine 10,110 allows for these types of player inputs, the present invention does not require them and can be used on gaming terminals having more, less, or different player inputs.

In FIG. 4, the five depicted reels 158*a-e* have a plurality of symbols 186 displayed thereon and one or more activated paylines 32 extending from one of the payline indicators 184*a-i* on the left side of the basic-game screen 155 to a corresponding one of the payline indicators 184*a-i* on the right side of the screen 155. Alternatively, the wagering game may be a scatter pay game that does not utilize paylines per se, but only requires that a predetermined number of symbols appear anywhere on the reels 158*a-e* and does not require that the symbols occur on particular reels or along particular paylines.

The symbols 186 displayed on the plurality of reels 158*a-e* are used to indicate a plurality of possible outcomes along each of the activated paylines 32. The reels 158*a-e* may be either traditional mechanical reels or computer-generated images of reels.

Standard gaming symbols such as "1-BAR" symbols, "2-BAR" symbols, "3-BAR" symbols, "CHERRY" symbols, "SEVEN" symbols, and "BELL" symbols may be depicted on the reels 158*a-e* in some embodiments. In some embodiments, the symbols 186 may represent a particular game theme and may be selected from images corresponding to the particular theme. Further explanation of the composition of the symbols 186 and/or their potential themes is not required to understand the present invention.

In one embodiment, a plurality of paylines 32 extend between pairs of payline indicators 184*a-i* such as, for example, the illustrated payline 32 that extends between payline indicators 184*e*. Each active payline 32 indicates a randomly selected outcome, which is the combination of symbols 186 displayed on the reels 158*a-e* along the particular payline 32. A player may play multiple paylines 32 by selecting the select-lines button 176 until the desired number of paylines 32 (up to nine in the illustrated embodiment) are displayed. While an embodiment with nine paylines is shown, a wagering game with a single payline, or any plurality of paylines will also work with the present invention. Additionally, though an embodiment with five reels is shown, a gaming machine with any plurality of reels may also be used in accordance with the present invention.

A winning combination occurs when the symbols 186 appearing on the reels 158*a-e* along an activated payline 32 correspond to one of the winning symbol combinations listed in a pay table stored in the memory 36 of the machine 10,110 or in the external systems 50. The pay table may be displayed on the secondary display area 16,116, the primary display area 14,114, or both and be either displayed constantly, intermittently, or upon request by a player (e.g., by selecting the pay-table button 174). Winning combinations listed in the pay table can include three like-symbols appearing on a payline yielding a first payout, four like-symbols appearing on a payline yielding a second, larger payout, and five like-symbols appearing on a payline yielding a third, even larger payout. Additional or alternative symbol combinations may be included within the pay table and further explanation is not required for purposes of the present invention. As illustrated in FIG. 4, a winning combination of symbols 186, in this example four bell symbols, is depicted along the payline 32 extending between payline indicators 184*e*.

Figure 5:
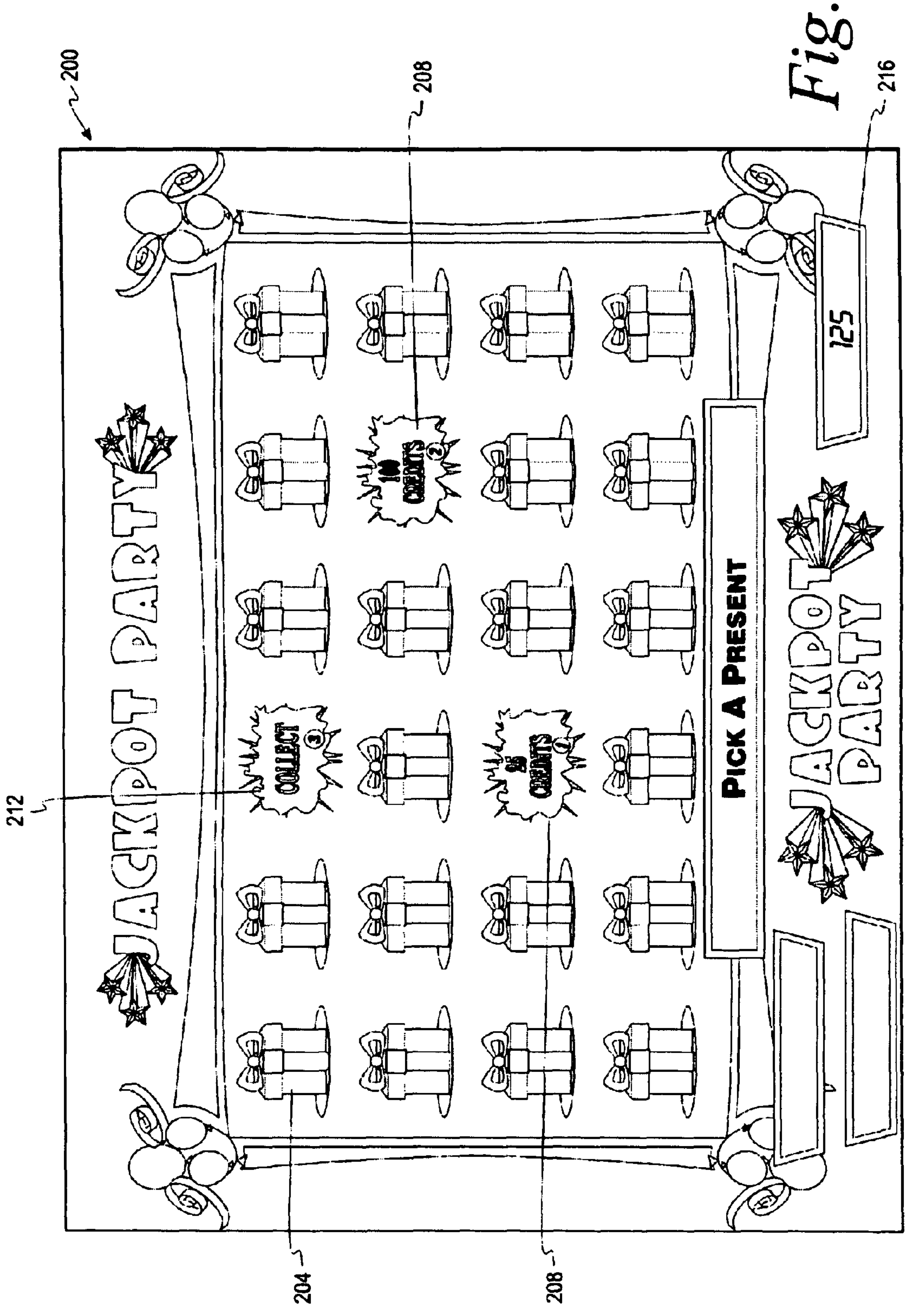
FIG. 5 is an image of a bonus-game screen of a wagering game that may be displayed on the gaming terminal of FIGS. 1*a* and 1*b*, according to one embodiment of the present invention.

Turning now to FIG. 5, a bonus game that may be included with a basic wagering game is illustrated, according to one embodiment. A bonus-game screen 200 includes an array of markers 204 located in a plurality of columns and rows. The bonus-game screen 200 may also include one or more meters, such as, a "bonus earned" meter 216 for displaying the number of credits the player has earned during that particular bonus game session. The bonus game may be entered upon the occurrence of a special start-bonus game outcome in the basic wagering game. Alternatively, the illustrated game may be a stand-alone wagering game.

In the illustrated bonus game, a player selects, one at a time, from an array of markers 204 each associated with a bonus-game outcome. When a marker 204 is selected, the associated bonus-game outcome is revealed. According to one embodiment, the plurality of markers 204 are associated with one or more award outcomes 208 and one or more end-game outcomes 212. Credits or other positive outcomes may be awarded when one of the award outcomes 208 is selected. Alternatively, when an end-game outcome is selected (or after a predetermined number of end-game outcomes 212 are selected), the bonus game is terminated and the accumulated award outcomes 208 are provided to the player. In the illustrated example, a player has selected an award outcome 208 with the player's first and second selection (25 credits and 100 credits respectively). The bonus game ends upon selection of the marker 204 associated with the end-game outcome 212 that was selected with the player's third selection. Picking games of the type described above need not be described further to understand embodiments of the present invention.

Figure 6:
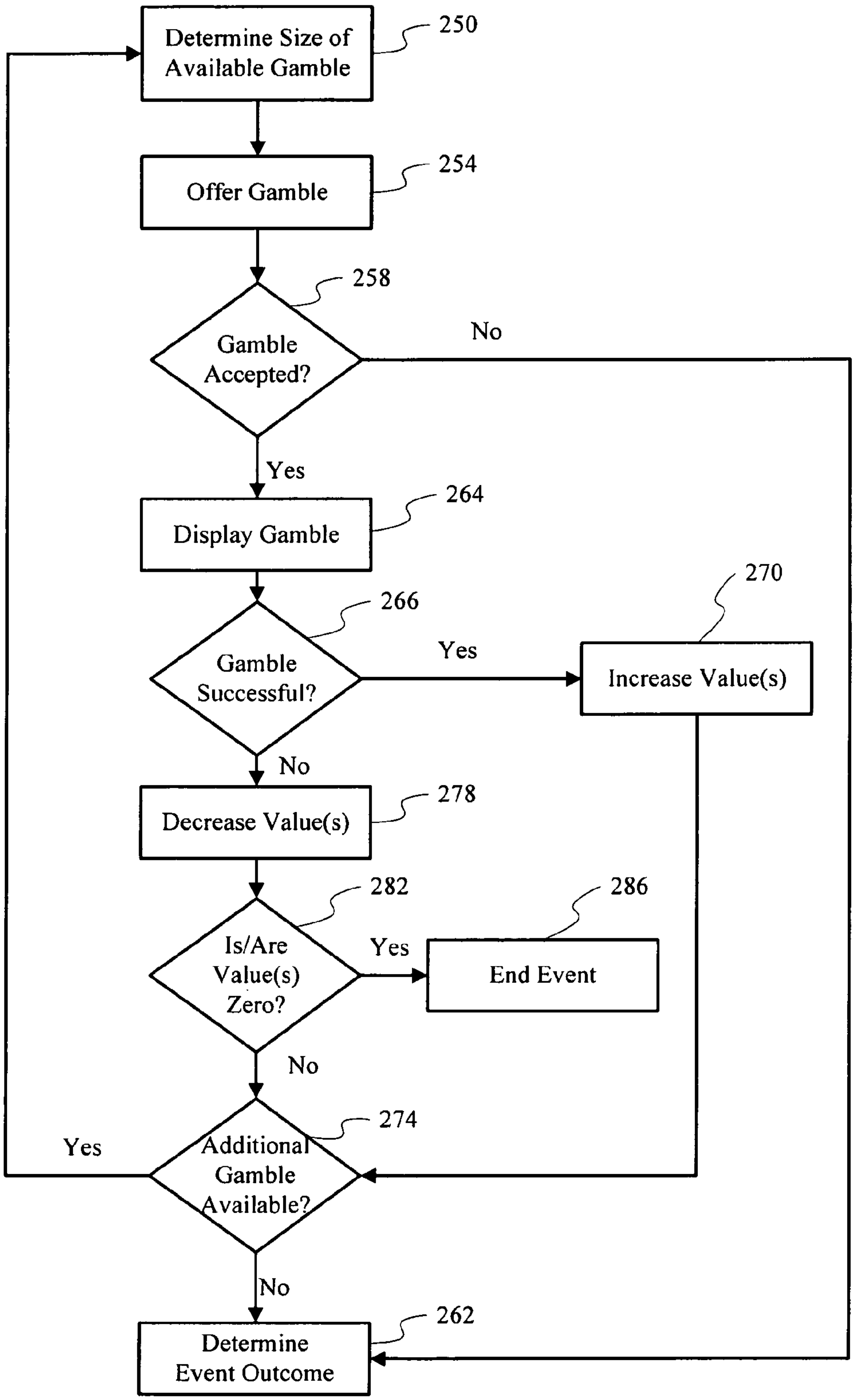
FIG. 6 is a flowchart illustrating a method for providing a gamble feature to a player, according to one embodiment of the present invention.

Referring now to FIG. 6, a "gamble feature" is provided to a player prior to conducting a wagering game or a portion thereof on the gaming machine 10,110, according to one embodiment. The gamble feature may be offered prior to a play of an event, such as the basic wagering game, a bonus game, or at any time prior to a winning or final outcome being presented to a player. The gamble feature may be offered for the entire event or any portion thereof. The gamble feature may be provided in a variety of forms and may affect different values (e.g., credit awards, enhancements, etc.) of a wagering game, as will be detailed more fully below.

When a gamble feature is to be offered to a player, a controller (for example, CPU 34) determines, at step 250, the size of the gamble available for offering. The gamble feature may be a "double up" type feature, wherein the player risks forfeiting the entire potential award in the upcoming wagering game for a chance at doubling the potential award that is available during the wagering game. Alternatively, the gamble feature may be a fractional increase/decrease, such as allowing the player to risk half of the potential award to improve the potential award to 150 percent of the original value. It should be understood that the gamble feature could be any fractional increase/decrease such as one-quarter, one-third, two-thirds, seven-eighths, etc., as will be discussed further with respect to FIGS. 7*a-d.*

For the purposes of this disclosure, the terms "potential award," "expected value," or "payback percentage" will be used to illustrate how the gamble feature affects the subsequent wagering game. These terms are used to demonstrate that the award a player will earn on average for the subsequent randomly generated outcome will be increased or decreased based on the outcome of the gamble feature. Thus, by increasing or decreasing the "potential award(s)," the "expected value," or the "payback percentage," the average award the player will earn is increased or decreased, respectively. These terms may be used interchangeably, but generally, "potential award" will be used to illustrate the individual award values within the wagering game or a portion thereof; "expected value" will be used to illustrate the value that a player anticipates earning on average through play of the wagering game or a portion thereof; and "payback percentage" will be used to illustrate the amount of the player's wager that is returned to the player on average at the conclusion of a play of the wagering game. It should be noted that by increasing/decreasing any one of the potential awards, expected value, or payback percentage, the others are increased/decreased as a result. It should also be noted that while "expected value" is generally used to refer to a portion of a wagering game (e.g., a particular award/symbol combination, a base game, a bonus game, etc.), it may also be used to describe the entirety of the wagering game (i.e., the sum or all the portions of the wagering game) and in such a case is synonymous with the "payback percentage" of the game as a whole when the overall expected value is expressed as a percentage.

Once the size of the gamble has been determined at step 250, the gamble is offered to the player at step 254. The gamble offer may be in the form of a decision offered to the player as to whether they desire to participate in the gamble feature. A determination is made at decision box 258 whether the player has chosen to participate in the gamble feature. If the player chooses not to participate in the gamble feature, the outcome for the gaming event is determined at step 262. When the player has chosen not to participate in the gamble feature, the gaming event is conducted having the events default expected value. If, however, the player chooses to accept the gamble, a gamble is displayed to the player at step 264. The displayed gamble may take the form of an X-or-Y choice to the player (see FIG. 7*a*), where X and Y are mutually exclusive decisions, such as selecting whether a card will be a red card or a black card.

After the player has selected X or Y, a determination is made at decision box 266 as to whether the player chose correctly. If the player chose correctly, the gamble is a success and the default expected value increases at step 270. The values are increased for the upcoming gaming event and increase based on the size of the gamble determined at step 250. Once the values have been increased, a determination is made at decision box 274 whether an additional gamble is available to the player, as further detailed below.

Alternatively, if at decision box 266 a determination is made that the player's choice was incorrect, the default expected value is decreased at step 278. Where the values in the upcoming wagering game have been decreased, a determination is made at decision box 282 as to whether the decreased expected value is equal to zero (e.g., has the player lost all potential awards/expected value for the subsequent event). If the determination is made that the decreased expected value is equal to zero, the event is ended at step 286 without proceeding further, as the player has forfeited any potential award possibilities for the upcoming gaming event. Alternatively, if the determination is made that the decreased expected value is not equal to zero, a determination is made at decision box 274 whether an additional gamble is available to the player.

If the default expected value to the player has been increased at step 270 or decreased at step 278, an additional gamble may be available to the player so long as the decreased expected value is not equal to zero. A determination is made at decision box 274 whether an additional gamble is available to the player. An additional gamble may be offered to allow the player to again attempt to increase the current expected value for the upcoming event. For example, if the player successfully doubled up their potential awards, the player may be offered the chance to double up again to achieve a 4× expected value (or an expected value of zero if unsuccessful) for the upcoming event. If the determination is made at decision box 274 that an additional gamble is not available, the outcome for the event is determined at step 262 with the increased/decreased expected value that has been earned by the player. Alternatively, if an additional gamble is available, the size of the additional gamble is determined at step 250.

The number of gambles available to a player may be limited by a game designer or by a casino. For example, the number of gambles may be limited to a single gamble offer prior to the determination of an event outcome. Alternatively, an unlimited number of gambles may be provided until the player is sufficiently unsuccessful such that the expected value for the upcoming event reaches zero (e.g., all possible winning combinations or non-zero values are unattainable). The player may be offered any predetermined number of gambles or the player's ability to further gamble may be limited by the level of success or failure of the gambles. For instance, in one embodiment, the player is allowed to gamble until the player reaches an upper threshold (e.g., a 4× expected value for the upcoming event) or a lower threshold (e.g., a ½× expected value for the event).

Figure 7A:
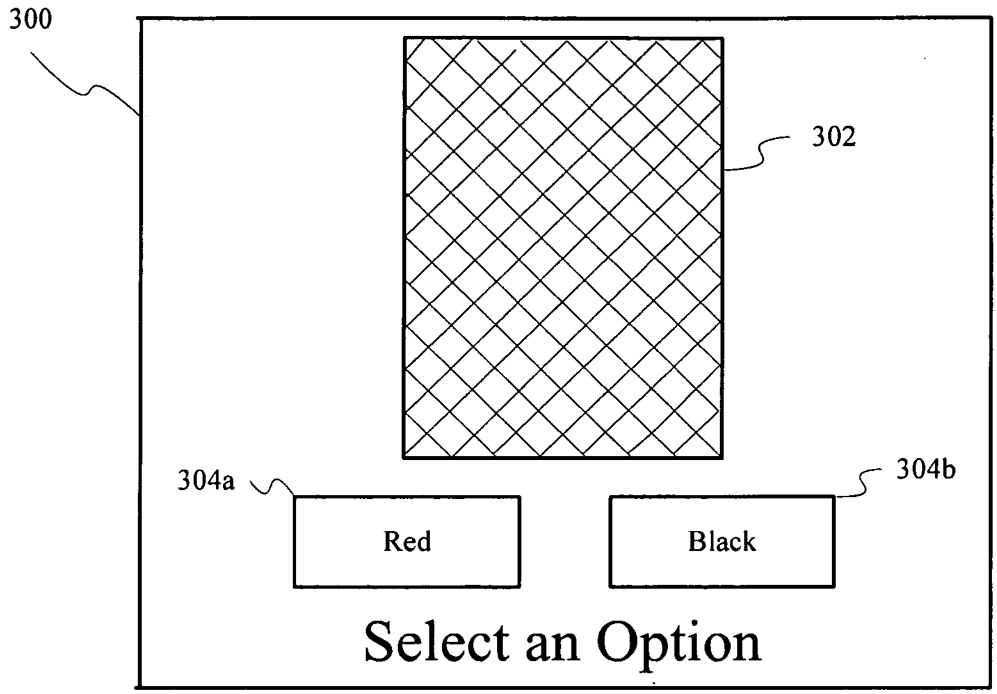
FIG. 7*a* is an image of a gamble-offer screen, according to one embodiment of the present invention.

Referring now to FIGS. 7*a-d*, a plurality of gamble offers are illustrated, according to various embodiments of the present invention. As illustrated in FIG. 7*a*, a Red-or-Black option is displayed on a gamble window 300. The gamble window 300 includes a card 302 that has not been revealed to the player and two player-selectable options, illustrated as a red option 304*a* and a black option 304*b*. In this embodiment, the odds of revealing a red card are identical to the odds of revealing a black card. This embodiment is particularly useful prior to gaming events where the increasing of the values increases the expected value for the gaming event linearly.

Figure 7B:
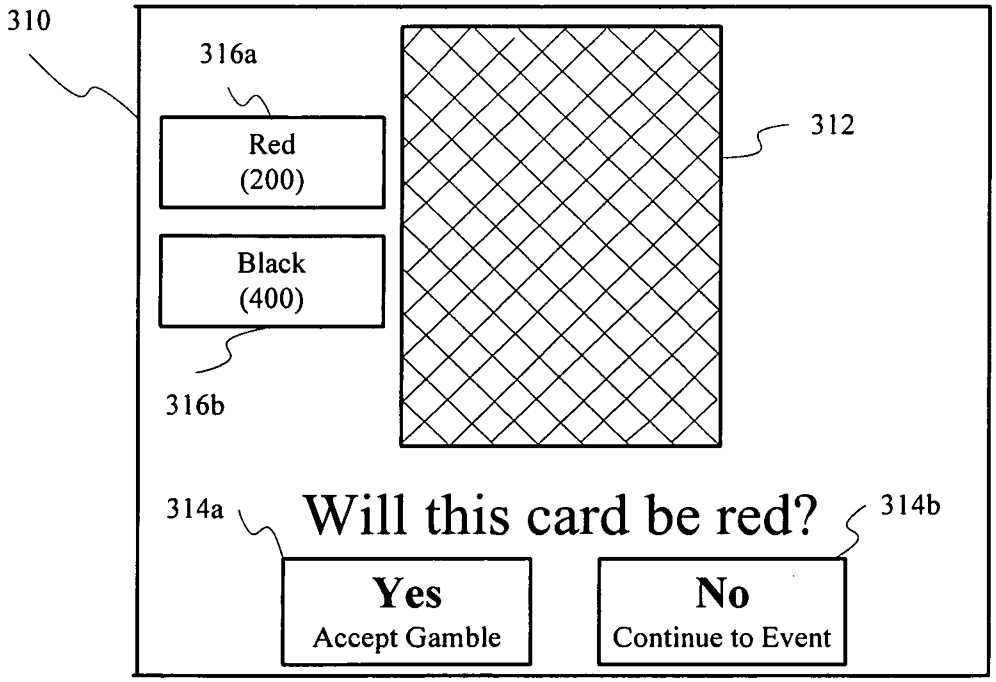
FIG. 7*b* is an image of an odds-balancing gamble-offer screen, according to one embodiment of the present invention.
Figure 7C:
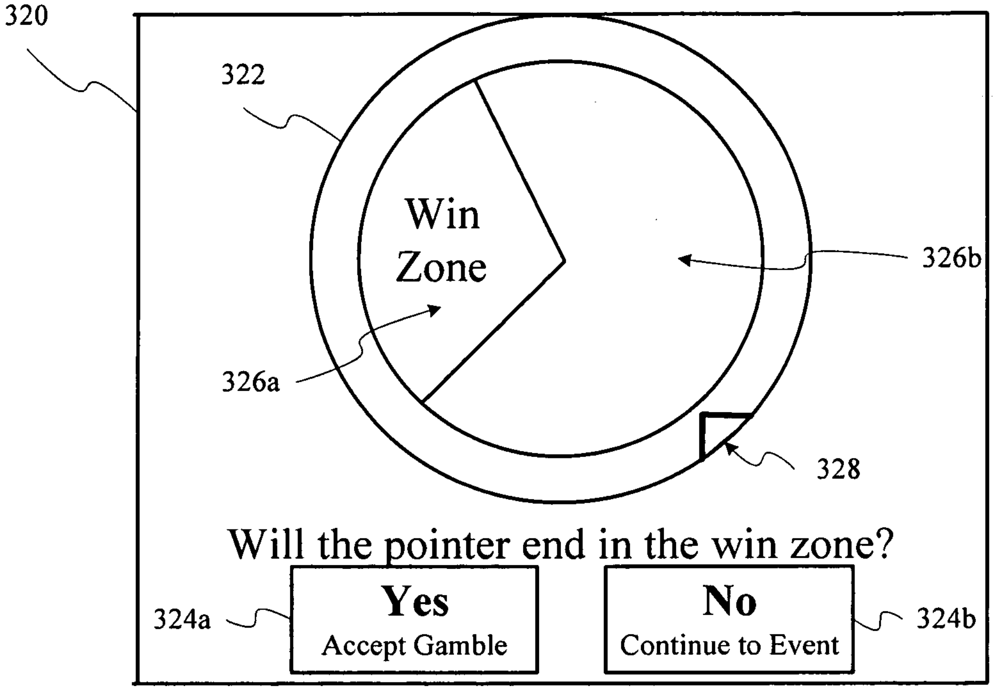
FIG. 7*c* is an image of an odds-balancing gamble-offer screen, according to another embodiment of the present invention.
Figure 7D:
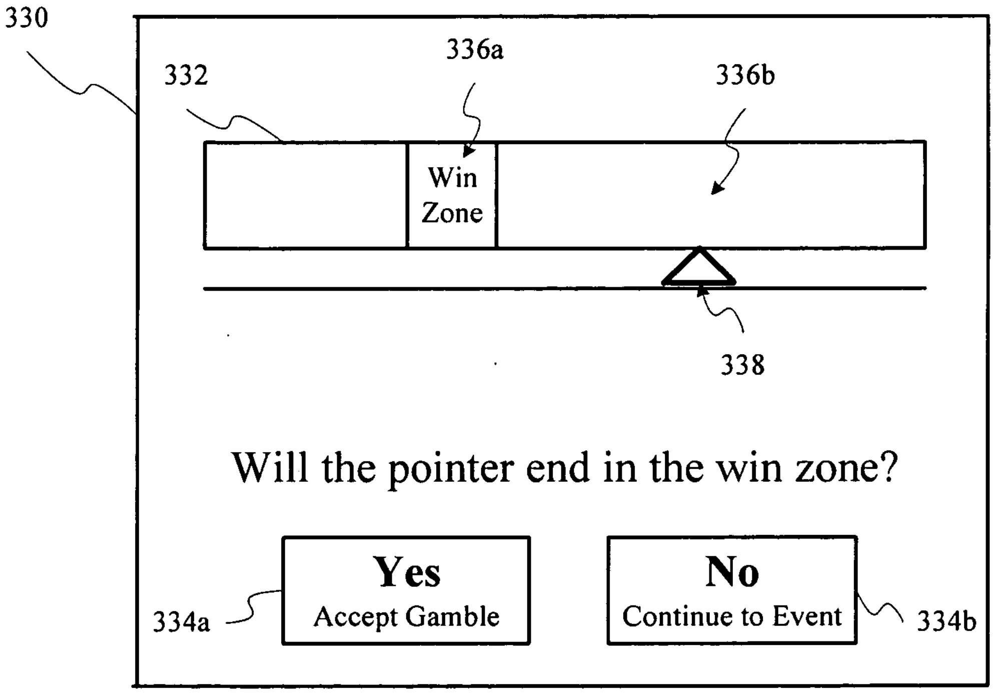
FIG. 7*d* is an image of an odds-balancing gamble-offer screen, according to still another embodiment of the present invention.

Other gamble-offer embodiments may be utilized for gaming events wherein the increasing of the values increases the expected value in a non-linear fashion. The gamble offers described with respect to FIGS. 7*b-d* are odds balanced such that the odds of a player achieving an increased expected value for the gaming event does not equal the odds of the player achieving a decreased expected value. For example, if the enhancement is increasing/decreasing the number of starting spins in a free-spin gaming event—and the free-spin gaming event provides the possibility of triggering additional spins during the free spins—an odds-balanced gamble offer may be utilized to adjust for the added increase in the expected value of the gaming event due to this "retrigger" feature (e.g., the more free spins a player begins the game with, the more likely the player is to trigger additional spins).

According to one embodiment, the gamble offer of FIG. 7*a* is adjusted such that there is a possibility of a non-red/black card being revealed. In this embodiment, the non-red/black card could be a winning card regardless of the player's choice. Generally, however, the non-red/black card would be a losing card and could be used to adjust the odds against a player achieving an increase in the values for the wagering event.

Similarly, according to the embodiment illustrated in FIG. 7*b*, an odds-balanced gamble offer is provided via a gamble window 310. The gamble window includes a card 312 that has not been revealed to the player and two player-selectable options, illustrated as an "accept gamble" option 314*a* and a "continue to event" option 314*b*. In this embodiment, the odds of revealing a red card are less than the odds of revealing a black card, as illustrated by the respective odds displays 316*a*, 316*b*. If the player desires to attempt to increase the expected value of the upcoming gaming event, the player selects the accept-gamble option 314*a* and is successful if the revealed card 312 is red. Alternatively, if the player does not wish to accept the gamble offer, the player selects the continue-to-event option 314*b* and the gaming event is begun without revealing the card 312 or increasing/decreasing the values of the gaming event. As illustrated, the player has a 1-in-3 chance of a red card being revealed. By adjusting the number of red cards to black cards, the gamble offer can be odds balanced to align with the non-linear increase/decrease in expected value of certain gaming events. This type of odds-adjusted gamble feature can be utilized to keep the probability of achieving a successful gamble readily apparent to a player.

Other methods of displaying odds-balance gamble offers are illustrated in FIGS. 7*c* and 7*d*. In FIG. 7*c*, a gamble window 320 includes a wheel 322 having a "win zone" 326*a* and a non-winning area 326*b*. A pointer 328 rotates around the wheel and two player-selectable options are provided—illustrated as an "accept gamble" option 324*a* and a "continue to event" option 324*b*. If the player desires to attempt to increase the expected value of the upcoming gaming event, the player selects the accept-gamble option 324*a* and is successful if the pointer 328 stops within the win zone 326*a*. Alternatively, if the player does not wish to accept the gamble offer, the player selects the continue-to-event option 324*b* and the gaming event is begun with the standard values of the gaming event.

The gamble window 330 of FIG. 7*d* is similar to the gamble window 320 in that a pointer 338 is moved along a path 332 having a win zone 336*a* and one or more non-winning areas 336*b*. If the player desires to attempt to increase the expected value of the upcoming gaming event, the player selects an accept-gamble option 334*a* and is successful if the pointer 338 stops within the win zone 336*a*. Alternatively, if the player does not wish to accept the gamble offer, the player selects the continue-to-event option 334*b* and the gaming event is begun with the standard values of the gaming event. In the embodiments illustrated in FIGS. 7*c* and 7*d*, the likelihood of a successful gamble can be increased or decreased by respectively increasing or decreasing the size of the win zone 326*a*, 336*a* with respect to the non-winning area(s) 326*b*, 336*b*. Thus, the probability can be adjusted as required to align with the value-enhancement associated with a successful gamble.

As discussed above, the gamble feature may be offered prior to the initiation or conclusion of any gaming event, such as a basic wagering game, a bonus game, or any portion(s) thereof. For example, the gamble option may be offered prior to a spin during a basic slots game or prior to a free-spin event. In other embodiments, the gamble option may be offered prior to a picking game—such as the one illustrated in FIG. 5—whether the game includes player-selectable picks or randomly selected picks. The gamble feature may affect the subsequent gaming event as a whole or may be applied to individual features as discussed below.

Multipliers

The gamble feature may be utilized to increase the number or size of one or more multipliers within the subsequent gaming event. For example, a successful gamble might add a 2× multiplier to all wild symbols such that all wins that include a wild symbol would be worth twice their standard value. Alternatively, a multiplier may be applied to every spin in a free spin event (or other slot-type event) (e.g., FIG. 4), every pick in a selection game (e.g., FIG. 5), top-box awards, or any other feature or award possibility within a gaming event.

Individual Values

The gamble feature may be used to increase the credit awards associated with particular symbol combinations or other award outcomes. In some embodiments, the gamble causes all of the credit awards available within a gaming event to increase or decrease accordingly. Alternatively, individual gambles may be provided allowing a player to gamble on individual symbol combinations or credit awards. For example, in a slot game, a gamble may be offered for one or more of the individual symbol combinations included in the pay table, as will be further described with respect to Table 1. Similarly, in a picking game such as the one illustrated in FIG. 5, one or more gamble offers may be associated with the individual award outcomes 208. The player may choose to gamble on none, one or more, or all of the various individual symbol combinations depending on the player's desired volatility and which symbol combinations have an associated gamble offer. Alternatively, the casino or game designer could limit the number of gambles a player may attempt or the number of symbol combinations/award outcomes for which a gamble offer may be accepted.

TABLE 1

| Outcome | 3 Cherries | 3 Bars | 3 Sevens |
|---|---|---|---|
| Standard Win Value | 10 Credits | 50 Credits | 250 Credits |
| Losing Gamble | 0 Credits | 25 Credits | 0 Credits |
| 1st Successful Gamble | 20 Credits | 75 Credits | 500 Credits |
| 2nd Successful Gamble | 40 Credits | 125 Credits | N/A |
| 3rd Successful Gamble | 80 Credits | 225 Credits | N/A |

According to one embodiment, individual gamble offers are provided to the player for a "3 cherry" symbol combination, a "3 bar" symbol combination, and a "3 seven" symbol combination. The 3-cherry and 3-bar symbol combinations allow for multiple gambles by a player, whereas the 3-seven symbol combination only allows a single gamble opportunity for a player. The gamble offers for the 3-cherry and 3-seven symbol combinations are a double-up type gamble, whereas the gamble offer for the 3-bars symbol combination is capped at twenty-five credits for a losing gamble. Thus, the first 3-bars gamble offer is a half-gamble, the second 3-bars gamble offer is a two-thirds gamble offer, etc.

As detailed in Table 1, the initial win value (i.e., standard win value) for a 3-cherries symbol combination is ten credits. If the player is successful with their first gamble, the award value becomes twenty credits for the upcoming gaming event. If the player is successful on a second gamble for the 3-cherries symbol combination, the award value becomes forty credits. If the player is unsuccessful in any of their gambles relating to the 3-cherries, the value for a 3-cherries winning outcome becomes zero credits. Alternatively, the initial win value for a 3-bar symbol combination is fifty credits and the first gamble is a half-gamble offer (e.g., twenty-five credits). If the player is successful with the first gamble, the player is offered a second gamble, which in this case is a two-thirds gamble (75 credits−25 credits=50 credits and $50/75=2/3$). In this manner, a losing gamble never results in the player receiving less than a predetermined threshold of credits for a winning symbol combination.

Wilds

The gamble feature may be employed to increase the number, size, location, or functionality of wild symbols within a slot game or other gaming event. In a slot game, for example, a gamble offer may be provided to increase/decrease the number of wild symbols that could appear on the reels 158*a-e* (see FIG. 4). In some embodiments, a gamble offer is provided that, if successful, converts all standard wild symbols (e.g., wilds that occupy only a single symbol position) into expanding wilds that expand to occupy an entire reel 158 if they appear on the reel 158 at the conclusion of a spin. A successful gamble may change the functionality of wild symbols such that when a wild appears at the conclusion of a spin, the wild symbol remains at the particular location for one or more subsequent spins. Another gamble offer may cause one or more wild or expanding wild symbols to shift from the fourth reel 158*d* to the second reel 158*b*—increasing the likelihood of forming a winning symbol combination in a slot game that pays left-to-right.

Paylines

In a slots game, such as the one illustrated in FIG. 5, the gamble feature may provide additional paylines 32 to a player after a successful gamble. The increase in the quantity of paylines 32 may result in additional awards being achieved during a subsequent spin of the reels 158*a-e*. In some embodiments, a successful gamble results in paylines 32 being provided from the right payline indicators 184*a-i* to the left payline indicators 184*a-i* in addition to the standard paylines that extend left to right across the reels 158*a-e*. In these embodiments, winning symbol combinations can begin on the first reel 158*a* and extend over at least the second reel 158*b* and the third reel 158*c*, or begin on the fifth reel 158*e* and extend over at least the fourth reel 158*d* and the third reel 158*c*. Alternatively, a gamble offer may be provided that converts the slot game from a payline game to a scatter pay game when the gamble is successful. A scatter pay game only requires that a predetermined number of symbols appear anywhere on the reels 158*a-e* and does not require that the symbols occur on particular reels or along particular paylines.

Quantity of Events/Spins/Selections

The gamble feature may provide additional opportunities for a player to achieve winning outcomes or credit awards. For example, a successful gamble offer may increase the number of free spins within a slot game (e.g., FIG. 4) or increase the number of selections within a picking game (e.g., FIG. 5). In some embodiments, a successful gamble results in a reduction in the number of end-game outcomes 212 or an increase in the number end-game outcomes 212 that must be selected before the gaming event is terminated. In other gaming events, additional random outcomes or selections can be provided to a player after a successful gamble.

In games where one or more dice are utilized, a successful gamble can increase the number of dice a player is able to throw, increase the numbers or values of the individual dice, or increase the number of times the player gets to throw the dice.

Odds of Winning

The gamble feature may be utilized to increase a player's odds of achieving a particular outcome. For example, a successful gamble might provide the player more possibilities to win a progressive award, a top box award, etc. Thus, while the standard chance of achieving a progressive-award outcome might be Z for a single handle pull, a successful gamble results in the player having an enhanced chance of 2Z, 5Z, or 100Z for the subsequent handle pull. In some embodiments, the chance of achieving the most valuable top-box award is increased in the same manner as described for the progressive award. In other embodiments, the number of top-box awards selected increases with a successful gamble. In one of these embodiments, the highest selected award (of the plurality of top-box selections) is provided to the player, thus increasing the player's chance to achieve the most valuable top-box award. In one embodiment, all of the selected top-box awards are accumulated and the aggregate award is provided to the player.

As discussed above, the gamble feature may be offered prior to the initiation or conclusion of any gaming event, such as a basic wagering game, a bonus game, or any portion(s) thereof. The gamble feature may be provided to a player at any time after the player places a wager. In some embodiments, the gamble feature is only available to the player when the player places the maximum wager for the wagering game. In some embodiments, the gamble feature is only available to the player when the player places an extra wager in addition to the standard wager for playing the wagering game. In these embodiments, the player may have a higher likelihood of achieving a successful gamble, or the magnitude of the increase to the expected value of the subsequent gaming event upon a successful gamble may be greater than the magnitude of the decrease upon an unsuccessful gamble.

Each of these embodiments and obvious variations thereof are contemplated as falling within the spirit and scope of the claimed invention, which is set forth in the following claims.

What is claimed is:

1. One or more non-transitory computer readable storage media encoded with instructions for directing a gaming system to perform a method comprising: receiving a wager from a player to play a wagering game, the wagering game having an overall payback percentage, a portion of the wagering game having a default expected value; offering an option to the player to play a gamble feature prior to play of the portion of the wagering game but after receiving the wager, the gamble feature having a possibility of a successful outcome or an unsuccessful outcome, the outcome of the gamble feature affecting the default expected value for the portion of the wagering game; receiving an input from the player to exercise the option to play the gamble feature; in response to the receiving, displaying on a display a plurality of game symbols associated with play of the gamble feature; indicating the outcome of the gamble feature with the plurality of game symbols; altering the default expected value of the portion of the wagering game based on the outcome of the gamble feature; and conducting the portion of the wagering game using the altered expected value.

2. The one or more non-transitory computer readable storage media of claim 1, wherein the outcome of the gamble feature is a successful outcome and the altering of the default expected value results in an increased expected value.

3. The one or more non-transitory computer readable storage media of claim 1, wherein the game symbols include a plurality of selectable objects.

4. The one or more non-transitory computer readable storage media of claim 3, wherein the plurality of selectable objects are player-selectable cards.

5. The one or more non-transitory computer readable storage media of claim 1, wherein the game symbols comprise a wheel and a pointer for indicating a stopping position on the wheel.

6. The one or more non-transitory computer readable storage media of claim 2, wherein the default expected value is altered by increasing the number of wild symbols available within the portion of the wagering game.

7. The one or more non-transitory computer readable storage media of claim 2, wherein the portion of the wagering game is a slots game including standard wild symbols, the default expected value being altered by changing the standard wild symbols to expanding wild symbols.

8. The one or more non-transitory computer readable storage media of claim 2, wherein the portion of the wagering game is a free-spin game having a number of free spins, the default expected value being altered by changing the number of free spins provided in the free-spin game.

9. The one or more non-transitory computer readable storage media of claim 2, wherein the portion of the wagering game is a picking game having a predetermined number of player picks, the default expected value being altered by changing the number of predetermined player picks.

10. The one or more non-transitory computer readable storage media of claim 2, wherein the portion of the wagering game is a picking game having a predetermined number of end-game outcomes, the default expected value being altered by changing the number of predetermined end-game outcomes.

11. The one or more non-transitory computer readable storage media of claim 1, wherein the gamble feature is odds balanced such that the possibility of the successful outcome is not equal to the possibility of the unsuccessful outcome.

12. The one or more non-transitory computer readable storage media of claim 1, wherein the portion of the wagering game is configured to have a first expected value in response to the determined outcome being the unsuccessful outcome and a second expected value in response to the determined outcome being the successful outcome, the relationship between the first expected value, the default expected value, and the second expected value being non-linear.

13. A gaming system, comprising: a value-input device for receiving a wager to play a wagering game, the wagering game having an overall payback percentage, a portion of the wagering game having a default expected value; a display for displaying the wagering game; and a controller operative to display an option for exercising a gamble feature on the display, the option being displayed prior to play of the portion of the wagering game but after receiving the wager, the gamble feature having a possibility of a successful outcome or an unsuccessful outcome, the outcome of the gamble feature affecting the default expected value for the portion of the wagering game, the gamble feature being odds balanced such that the possibility of the successful outcome is not equal to the possibility of the unsuccessful outcome, in response to receiving an input to exercise the option, displaying on the display a plurality of game symbols associated with play of the gamble feature, determine the outcome of the gamble feature, indicating the outcome of the gamble feature with the plurality of game symbols, alter the default expected value for the portion of the wagering game based on the determined outcome of the gamble feature, and conduct the wagering game on the primary display using the altered expected value.

14. The gaming system of claim 13, wherein the controller only displays the option for exercising the gamble feature when the value-input device has received a maximum wager.

15. The gaming system of claim 13, wherein the wagering game has a plurality of possible outcomes, the controller altering the default expected value by adjusting the possibility of achieving at least one of the possible outcomes.

16. The gaming system of claim 13, wherein the controller alters the default expected value for the wagering game by adjusting at least one multiplier value within the wagering game.

17. The gaming system of claim 13, wherein the default expected value is equal to the overall payback percentage for the wagering game.

18. The gaming system of claim 13, wherein the portion of the wagering game is configured to have a first expected value in response to the determined outcome being the unsuccessful outcome and a second expected value in response to the determined outcome being the successful outcome, the relationship between the first expected value, the default expected value, and the second expected value being non-linear.

19. A method of conducting a wagering game on a gaming system, the method comprising: receiving a wager from a player to play the wagering game, a portion of the wagering game having a default potential award; offering an option to play a gamble feature prior to play of the portion of the wagering game but after receiving the wager; determining whether the option to play the gamble feature has been accepted or declined; conducting, in response to the option being declined, the portion of the wagering game utilizing the default potential award; in response to the option being accepted, displaying on a display a plurality of game symbols associated with play of the gamble feature; indicating, in response to the option being accepted, an outcome of the gamble feature with the plurality of game symbols; determining, in response to the option being accepted, whether the outcome of the gamble feature is successful or unsuccessful; conducting, in response to the gamble feature being successful, the portion of the wagering game having an increased potential award, the increased potential award being greater than the default potential award; and conducting, in response to the gamble feature being unsuccessful, the portion wagering game having a decreased potential award, the decreased potential award being lower than the default potential award.

20. The method of claim 19 further comprising, offering a second option to play another gamble feature prior to play of the wagering game in response to the gamble feature being successful.

21. The method of claim 19, wherein the likelihood of the gamble feature being successful is identical to the likelihood of the gamble feature being unsuccessful.

22. The method of claim 19, wherein the gamble feature is a double-up type gamble feature.

23. The method of claim 19, wherein the gamble feature is odds balanced such that the likelihood of a successful outcome of the gamble is not equal to the likelihood of an unsuccessful outcome.

24. The method of claim 19, wherein the portion of the wagering game is configured to have a first potential award in response to the gamble feature being unsuccessful and a second potential award in response to the gamble feature being successful, the relationship between the first potential award, the default potential award, and the second potential award being non-linear.

25. A method of conducting a wagering game on a gaming system, the method comprising: receiving, via an input device associated with the wagering game, a wager to play the wagering game, the wagering game having an overall payback percentage, a portion of the wagering game having a default expected value; offering, on a display associated with the wagering game, an option to play a gamble feature prior to play of the portion of the wagering game but after receiving the wager, the gamble feature having a possibility of a successful outcome or an unsuccessful outcome, the outcome of the gamble feature affecting the default expected value for the portion of the wagering game, the gamble feature being odds balanced such that the possibility of a successful outcome is not equal to the possibility of an unsuccessful outcome; in response to receiving an input to exercise the option, displaying on the display a plurality of game symbols associated with play of the gamble feature; and indicating the outcome of the gamble feature with the plurality of game symbols.

26. The method of claim 25, wherein the portion of the wagering game is configured to have a first expected value in response to the unsuccessful outcome and a second expected value in response to the successful outcome, the relationship between the first expected value, the default expected value, and the second expected value being non-linear.

27. A method of conducting a wagering game on a gaming system, the method comprising: receiving, via an input device, an input indicative of a wager to play the wagering game; offering, on a display, an option to play a gamble feature prior to play of a game segment of the wagering game but after receiving the wager; receiving, via an input device, an input for accepting or declining the option; and conducting, by one or more processors, the game segment according to whether the option is accepted or declined and whether the gamble feature has a successful or unsuccessful outcome such that in response to the option being accepted a plurality of game symbols associated with the gamble feature are displayed and the gamble feature outcome is indicated by the plurality of game symbols; wherein the game segment has (i) a default expected value in response to the option being declined, (ii) a first expected value less than the default expected value in response to the option being accepted and the gambling feature having an unsuccessful outcome, and (iii) a second expected value greater than the default expected value in response to the option being accepted and the gambling feature having a successful outcome, a relationship between the default expected value, the first expected value, and the second expected value being non-linear; wherein the gamble feature is odds balanced such that the odds of the successful outcome is not equal to the odds of the unsuccessful outcome to account for the non-linear relationship between the default expected value, the first expected value, and the second expected value.

* * * * *

UNITED STATES PATENT AND TRADEMARK OFFICE

CERTIFICATE OF CORRECTION

PATENT NO. : 8,550,895 B2
APPLICATION NO. : 12/670131
DATED : October 8, 2013
INVENTOR(S) : Edidin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Signed and Sealed this
Fifteenth Day of September, 2015

Michelle K. Lee
*Director of the United States Patent and Trademark Office*